(12) United States Patent
Yasuhara (10) Patent No.: US 12,061,398 B2
(45) Date of Patent: Aug. 13, 2024

(54) LIGHT CONTROL SHEET AND METHOD OF PRODUCING LIGHT CONTROL SHEET

(71) Applicant: TOPPAN Inc., Taito-ku (JP)

(72) Inventor: Toshiji Yasuhara, Taito-ku (JP)

(73) Assignee: TOPPAN Inc., Taito-ku (JP)

( * ) Notice: Subject to any disclaimer, the term of this patent is extended or adjusted under 35 U.S.C. 154(b) by 0 days.

(21) Appl. No.: 18/317,300

(22) Filed: May 15, 2023

(65) Prior Publication Data

US 2023/0288760 A1 Sep. 14, 2023

Related U.S. Application Data

(63) Continuation of application No. PCT/JP2021/042239, filed on Nov. 17, 2021.

(30) Foreign Application Priority Data

Nov. 17, 2020 (JP) .................. 2020-191231

(51) Int. Cl.
*G02F 1/1343* (2006.01)
*G02F 1/1345* (2006.01)

(52) U.S. Cl.
CPC ...... *G02F 1/13439* (2013.01); *G02F 1/13458* (2013.01)

(58) Field of Classification Search
None
See application file for complete search history.

(56) References Cited

U.S. PATENT DOCUMENTS

2021/0362477 A1 11/2021 Gima
2023/0280621 A1* 9/2023 Yamamoto ............... G02F 1/13
349/56

FOREIGN PATENT DOCUMENTS

JP 2018-045135 A 3/2018
JP 2019-105680 A 6/2019

OTHER PUBLICATIONS

International Search Report issued Jan. 18, 2022 in International Application No. PCT/JP2021/042239 filed Nov. 17, 2021, 5 pages (with English Translation).
Extended European Search Report issued Apr. 19, 2024 in European Patent Application No. 21894682.0.

* cited by examiner

*Primary Examiner* — Dung T Nguyen
(74) *Attorney, Agent, or Firm* — Oblon, McClelland, Maier & Neustadt, L.L.P.

(57) ABSTRACT

A light control sheet includes transparent electrodes including a first and second transparent electrode layers, a light control layer, a transparent support layer, and a covering layer. The transparent support layer has a support surface supporting the first transparent electrode layer, the first transparent electrode layer includes a first electrode element and a second electrode element aligned along the support surface and electrically insulated from each other by a groove extending in a direction along the support surface of the transparent support layer and that the groove is penetrating through the transparent support layer and the first transparent electrode layer in a depth direction of the groove and has an opening on the protected surface of the transparent support layer, and the covering layer is formed such that the covering layer is covering the opening of the groove formed in the transparent support layer and the first transparent electrode layer.

20 Claims, 5 Drawing Sheets

LIGHT CONTROL SHEET AND METHOD OF PRODUCING LIGHT CONTROL SHEET

CROSS-REFERENCE TO RELATED APPLICATIONS

The present application is a continuation of International Application No. PCT/JP2021/042239, filed Nov. 17, 2021, which is based upon and claims the benefits of priority to Japanese Application No. 2020-191231, filed Nov. 17, 2020. The entire contents of all of the above applications are incorporated herein by reference.

BACKGROUND OF THE INVENTION

Field of the Invention

The present invention relates to a light control sheet having a variable light transmittance, and a method of producing the light control sheet.

Description of Background Art

A light control sheet includes a light control layer that contains a liquid crystal composition, and a pair of transparent electrode layers that sandwich the light control layer. A drive voltage is applied between the pair of transparent electrode layers. Depending on a potential difference between the pair of transparent electrode layers, the orientation state of liquid crystal molecules varies, and thus the light transmittance of the light control sheet varies. For example, when the major axis direction of liquid crystal molecules is along the thickness direction of the light control layer, the light control sheet is colorless and transparent as well as high in light transmittance. When the major axis direction of liquid crystal molecules is orthogonal to the thickness direction of the light control layer, light is scattered in the light control layer, and the light transmittance of the light control sheet is low (see, for example, JP 2018-45135 A). The entire contents of this publication are incorporated herein by reference.

SUMMARY OF THE INVENTION

According to one aspect of the present invention, a light control sheet includes transparent electrodes including a first transparent electrode layer and a second transparent electrode layer, a light control layer formed between the first transparent electrode layer and the second transparent electrode layer, a transparent support layer formed on the first transparent electrode layer on the opposite side with respect to the light control layer, and a covering layer formed on the transparent support layer on the opposite side with respect to the first transparent electrode layer. The transparent support layer has a support surface supporting the first transparent electrode layer and a protected surface on the opposite side with respect to the support surface, the first transparent electrode layer includes a first electrode element and a second electrode element such that the first electrode element and the second electrode element are aligned along the support surface of the transparent support layer and electrically insulated from each other by a groove extending in a direction along the support surface of the transparent support layer and that the groove is penetrating through the transparent support layer and the first transparent electrode layer in a depth direction of the groove and has an opening on the protected surface of the transparent support layer, and the covering layer is formed such that the covering layer is covering the opening of the groove formed in the transparent support layer and the first transparent electrode layer.

According to another aspect of the present invention, a method of producing a light control sheet includes forming a laminate including a first transparent electrode layer, a second transparent electrode layer, a light control layer, and a transparent support layer, making a cut in the laminate such that a groove is formed to penetrate through the transparent support layer and the first transparent electrode layer and that a first electrode element and a second electrode element separated by the groove are formed in the first transparent electrode layer, and laminating a covering layer on the laminate such that the covering layer covers an opening of the groove formed in the transparent support layer and the first transparent electrode layer. The light control layer is formed between the first transparent electrode layer and the second transparent electrode layer, the transparent support layer is formed on the first transparent electrode layer on the opposite side with respect to the light control layer and has a support surface supporting the first transparent electrode layer, and the cut is made in the laminate from a side where the transparent support layer is formed relative to the light control layer such that the groove extends in a direction along the support surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments will now be described with reference to the accompanying drawings, wherein like reference numerals designate corresponding or identical elements throughout the various drawings.

Light Control Sheet

Figure 1:
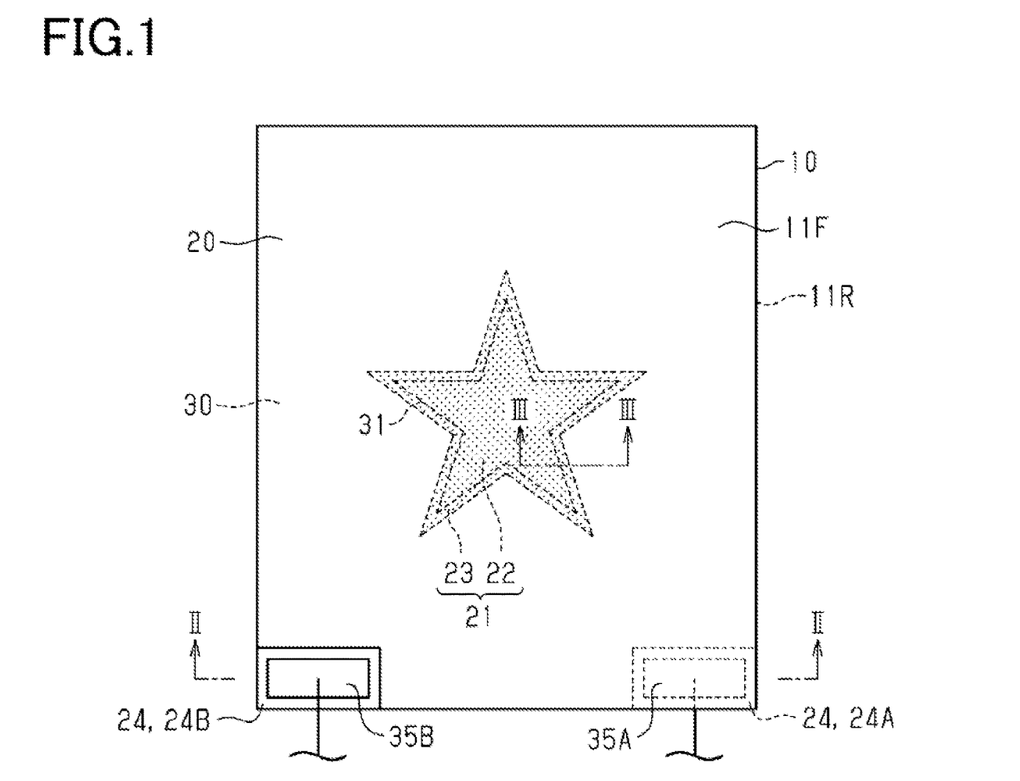
FIG. 1 is a diagram illustrating a planar structure of a light control sheet according to an embodiment of the present invention.

As illustrated in FIG. 1, a light control sheet 10 has a first surface 11F, and a second surface 11R that is a surface opposite the first surface 11F. When seen from a position facing the first surface 11F, the light control sheet 10 includes a drive region 20, a non-driven region 21, and a connection region 24.

The drive region 20 is a region where a drive electrode element 30 is positioned. The drive electrode element 30 is an electrode element to which a voltage signal is applied when the light control sheet 10 is driven. The light transmittance of the drive region 20 varies depending on the application state of a voltage signal to the drive electrode element 30. The drive electrode element 30 is an example of the first electrode element.

The non-driven region 21 contains a floating region 22 that is a region where a floating electrode element 31, which is an electrode element not to be applied with a voltage signal when the light control sheet 10 is driven, is positioned, and a boundary region 23 that surrounds the floating region 22. The floating electrode element 31 is an example of the second electrode element. The boundary region 23 is positioned between the drive region 20 and the floating region 22 and has a closed frame shape that surrounds the floating region 22. An electrode element is not positioned in the boundary region 23. The light transmittance of the non-driven region 21 does not vary between when the light control sheet 10 is driven and when it is not driven.

The floating region 22 constitutes a design. The design is displayed on the light control sheet 10 by the manifestation of the floating region 22. The design may be, for example, at least one or a combination of a letter, number, symbol, figure, picture, and pattern. The light control sheet 10 may include multiple floating regions 22 spaced apart from one another, that is, multiple non-driven regions 21 spaced apart from one another.

The connection region 24 is a region to be connected with a wiring for applying a voltage signal to the drive region 20. The connection region 24 includes a first connection region 24A and a second connection region 24B. A first terminal unit 35A is disposed in the first connection region 24A, and a second terminal unit 35B is disposed in the second connection region 24B. The connection regions 24A and 24B are each adjacent to the drive region 20 and positioned, for example, at the edge of the light control sheet 10.

Figure 2:
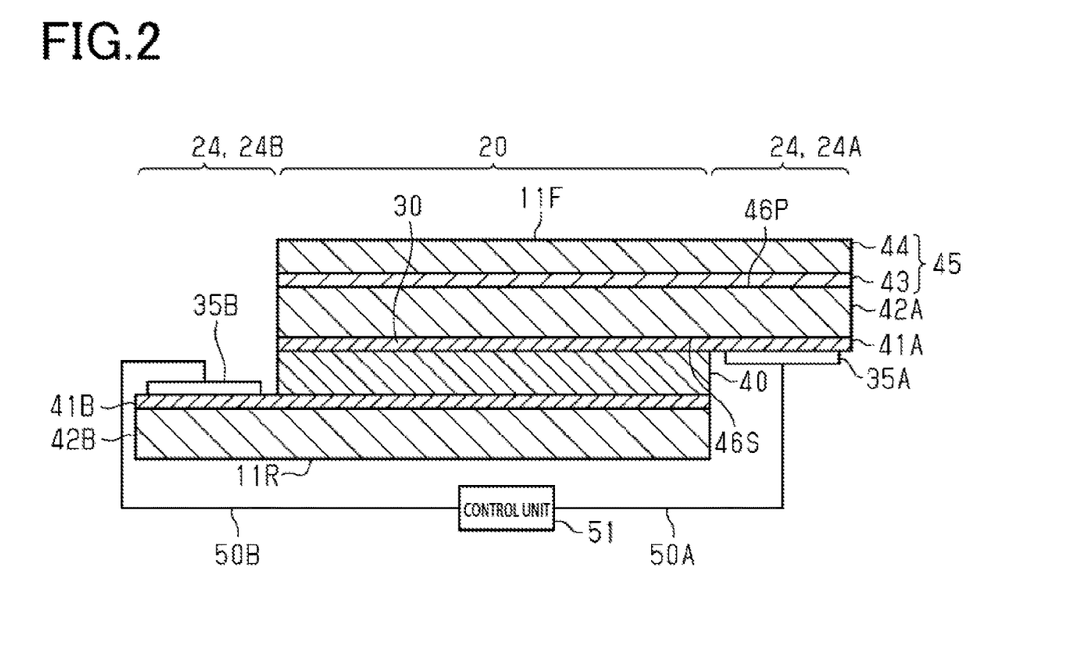
FIG. 2 is a diagram illustrating a cross-sectional structure taken along line II-II in FIG. 1.

FIG. 2 is a cross-sectional view taken along line II-II in FIG. 1, that is, illustrating a cross-sectional structure of the light control sheet 10 in the drive region 20 and the connection region 24.

As illustrated in FIG. 2, the light control sheet 10 includes a light control layer 40, a first transparent electrode layer 41A, a second transparent electrode layer 41B, a first transparent support layer 42A, a second transparent support layer 42B, and a covering layer 45. The light control layer 40 is interposed between the first transparent electrode layer 41A and the second transparent electrode layer 41B and in contact with these transparent electrode layers 41A and 41B. The first transparent support layer 42A supports the opposite side of the first transparent electrode layer 41A to that facing the light control layer 40, and the second transparent electrode layer 42B supports the opposite side of the second transparent electrode layer 41B to that facing the light control layer 40.

The above-described drive electrode element 30 and floating electrode element 31 are contained in the first transparent electrode layer 41A. A portion the first transparent electrode layer 41A positioned in the drive region 20 is the drive electrode element 30. Also, of two surfaces of the first transparent support layer 42A, a surface that is in contact with the first transparent electrode layer 41A and supports the first transparent electrode layer 41A is a support surface 46S, and a surface opposite the support surface 46S is a protected surface 46P.

The covering layer 45 is positioned on the opposite side of the first transparent support layer 42A to that facing the first transparent electrode layer 41A. The covering layer 45 contains an adhesive layer 43 and a protective layer 44. The adhesive layer 43 is in contact with the protected surface 46P of the first transparent support layer 42A. The protective layer 44 is in contact with the opposite side of the adhesive layer 43 to that facing the first transparent support layer 42A.

The first surface 11F of the light control sheet 10 is a surface of the covering layer 45 and specifically a surface of the protective layer 44 opposite to that in contact with the adhesive layer 43. The second surface 11R of the light control sheet 10 is a surface of the second transparent support layer 42B opposite to that in contact with the second transparent electrode layer 41B. The second surface 11R is bonded to a transparent plate made of glass, resin, or the like via an adhesive layer. The transparent plate may be, for example, a window glass of various buildings such as a house, a station, and an airport, a partition installed in an office, a display window installed in a store, or a window glass or windshield of a mobile object such as a vehicle or an aircraft. Each surface of the transparent plate may be flat or curved.

In the first connection region 24A, the first transparent electrode layer 41A supported by the first transparent support layer 42A extends from the drive region 20 and is exposed from the light control layer 40. The first terminal unit 35A is connected to this exposed portion of the first transparent electrode layer 41A. In other words, the drive electrode element 30 extends from the drive region 20 to the first connection region 24A, and the first terminal unit 35A is connected to the drive electrode element 30 in the first connection region 24A.

In the second connection region 24B, the second transparent electrode layer 41B and the second transparent support layer 42B extend from the drive region 20, with the second transparent electrode layer 41B exposed from the light control layer 40. This exposed portion of the second transparent electrode layer 41B is connected with the second terminal unit 35B.

A first wiring member 50A extends from the first terminal unit 35A, and a second wiring member 50B extends from the second terminal unit 35B. These wiring members 50A and 50B are connected to a control unit 51. The control unit 51 applies a voltage signal to the drive electrode element 30 of the first transparent electrode layer 41A via the first wiring member 50A and the first terminal unit 35A and applies a voltage signal to the second transparent electrode layer 41B via the second wiring member 50B and the second terminal unit 35B. Accordingly, the control unit 51 controls a potential difference between the first transparent electrode layer 41A and the second transparent electrode layer 41B in the drive region 20. The potential of the second transparent electrode layer 41B is controlled to, for example, a ground potential. The light control sheet 10 and the control unit 51 constitute a light control device.

The light control layer 40 includes a transparent polymer layer and a liquid crystal composition. The transparent polymer layer has voids, and the voids are filled with the liquid crystal composition. The liquid crystal composition contains liquid crystal molecules. As the liquid crystal molecules, a known material may be used. Examples of the liquid crystal molecules include liquid crystal molecules based on Schiff bases, azo types, azoxy types, biphenyls, terphenyls, benzoic acid esters, tolans, pyrimidines, cyclohexanecarboxylic acid esters, phenylcyclohexanes, and dioxanes.

The type in which the liquid crystal composition is retained in the light control layer 40 is one of a polymer network type, a polymer dispersion type, and a capsule type. The polymer network-type light control layer 40 includes a transparent polymer network having a three-dimensional mesh shape. Voids of the mesh communicate with one another and retain the liquid crystal composition therein. The polymer network is an example of the transparent polymer layer. The polymer dispersion-type light control layer 40 contains a large number of isolated voids in a transparent polymer layer and retains a liquid crystal composition in the voids dispersed in the polymer layer. The capsule-type light control layer 40 retains an encapsulated liquid crystal composition in a transparent polymer layer. It is noted that the liquid crystal composition may contain, in addition to the above-described liquid crystal molecules, a monomer for forming a transparent polymer layer, a dichroic dye, and others.

The first transparent electrode layer 41A and the second transparent electrode layer 41B are each electrically conductive and transparent to light in the visible region. As a material of the transparent electrode layers 41A and 41B, a known material may be used. Examples of the material of the transparent electrode layers 41A and 41B include indium tin oxide, fluorine-doped tin oxide, tin oxide, zinc oxide, carbon nanotubes, and poly(3,4-ethylenedioxythiophene).

The first transparent support layer 42A and the second transparent support layer 42B are each a substrate that is transparent to light in the visible region. As a material of the transparent support layers 42A and 42B, a known material may be used. The material of the transparent support layers 42A and 42B may be a synthetic resin or an inorganic compound. Examples of the synthetic resin include polyester, polyacrylate, polycarbonate, and polyolefin. Examples of the polyester include polyethylene terephthalate and polyethylene naphthalate. An example of the polyacrylate is polymethyl methacrylate. Examples of the inorganic compound include silicon dioxide, silicon oxynitride, and silicon nitride.

The adhesive layer 43 is a layer that is transparent to light in the visible region and includes a resin having adhesiveness and insulation properties. As a material of the adhesive layer 43, a known material may be used. For example, the adhesive layer 43 includes an optical clear adhesive (OCA).

The protective layer 44 is a layer that is transparent to light in the visible region. As a material of the protective layer 44, a known material may be used. Examples of the material of the protective layer 44 include synthetic resins such as polyethylene terephthalate, polyethylene naphthalate, polymethyl methacrylate, polycarbonate, polyolefin, and triacetyl cellulose. The protective layer 44 may have an antireflection function.

The first terminal unit 35A and the second terminal unit 35B each include, for example, a conductive adhesive layer and a wiring board. The conductive adhesive layer may be formed of, for example, an anisotropic conductive film (ACF), an anisotropic conductive paste (ACP), an isotropic conductive film (ICF), or an isotropic conductive paste (ICP). The wiring board may be, for example, a flexible printed circuit (FPC).

Alternatively, the first terminal unit 35A and the second terminal unit 35B may each have a structure in which a conductive material such as a conductive tape is soldered to a lead.

In the drive region 20, the orientation of the liquid crystal molecules in the light control layer 40 changes in response to a voltage change that occurs between the two transparent electrode layers 41A and 41B. The change in the orientation of the liquid crystal molecules changes the scattering degree, absorption degree, and transmission degree of visible light entering the light control layer 40.

Specifically, when no voltage is applied to the transparent electrode layers 41A and 41B, the major axis directions of the liquid crystal molecules are irregular. This increases the degree of scattering of light entering the light control layer 40, and the drive region 20 appears turbid. That is, when no drive voltage is applied to the light control layer 40, the drive region 20 is opaque. On the other hand, when a voltage signal is applied to the transparent electrode layers 41A and 41B, and a potential difference having a predetermined value or more is applied between the first transparent electrode layer 41A and the second transparent electrode layer 41B, the liquid crystal molecules are oriented, and the major axis directions of the liquid crystal molecules are directed along the electric field direction between the transparent electrode layers 41A and 41B. As a result, the light control layer 40 more easily transmits light, and the drive region 20 becomes transparent.

Figure 3:
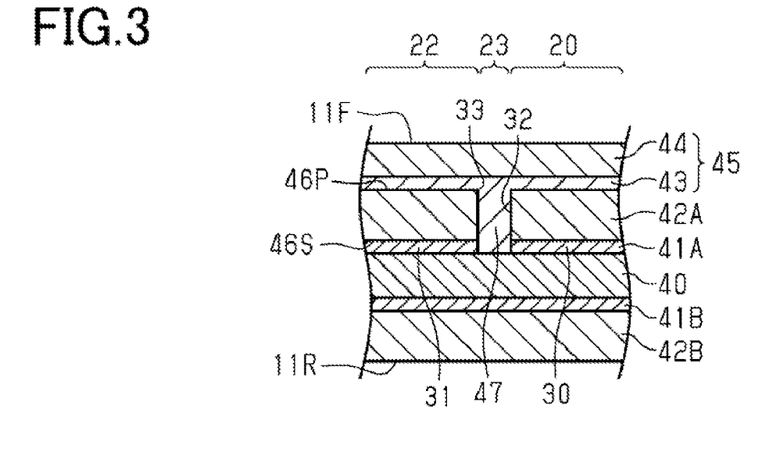
FIG. 3 is a diagram illustrating an example of a cross-sectional structure taken along line III-III in FIG. 1.

FIG. 3 is a cross-sectional view taken along line III-III in FIG. 1, that is, illustrating a cross-sectional structure of the light control sheet 10 in the boundary region 23 as well as the drive region and the floating region 22 which sandwich the boundary region 23.

As illustrated in FIG. 3, in the first transparent electrode layer 41A, the drive electrode element 30 is positioned in the drive region 20, and the floating electrode element 31 is positioned in the floating region 22. In other words, the drive electrode element 30 and the floating electrode element 31 are separate layer members aligning along the support surface 46S.

The drive electrode element 30 and the floating electrode element 31 are separated by a groove 32. The depth direction of the groove 32 is the thickness direction of the first transparent electrode layer 41A. The groove 32 penetrates the first transparent support layer 42A and the first transparent electrode layer 41A in the depth direction. The drive electrode element 30 and the floating electrode element 31 are separated by the groove 32 and thus insulated from each other.

A region where the groove 32 is positioned, when seen from a position facing the first surface 11F of the light control sheet 10, is the boundary region 23. As described above, the boundary region 23 has a closed frame shape that surrounds the floating region 22. That is, the groove 32 extends in a direction along the support surface 46S and has a closed frame shape that surrounds the entire periphery of the floating electrode element 31 when seen from a position facing the first surface 11F. Since the floating electrode element 31 is not connected with a wiring for applying a voltage signal, the floating electrode element 31 is in an electrically floating state.

Therefore, in the floating region 22, the degree of scattering of light entering the light control layer 40 is always large. Also, since an electrode element is not positioned in the boundary region 23 in the first transparent electrode layer 41A, the degree of scattering of light entering the light control layer 40 is also always large in the boundary region 23. Thus, the non-driven region 21 always appears turbid.

The groove 32 has an opening 33 on the protected surface 46P of the first transparent support layer 42A. The opening 33 is covered by the adhesive layer 43 of the covering layer 45. Moreover, an adhesive portion 47 extends from the adhesive layer 43 to the inside of the groove 32, and the groove 32 is filled with the adhesive portion 47. The material of the adhesive portion 47 is the same as that of the adhesive layer 43. The adhesive portion 47 is an example of a filling portion.

Insulation reliability between the drive electrode element 30 and the floating electrode element 31 is enhanced by the fact that the inside of the groove 32 is filled with the adhesive portion 47 having insulation properties. Also, an adhesive constituting the adhesive layer 43 and the adhesive portion 47, which is a material to easily ensure fluidity and flexibility during production, can appropriately fill the groove 32. Moreover, since the protective layer 44 is laminated on the adhesive layer 43, adhesion of dirt to the first surface 11F of the light control sheet 10 is suppressed, and handling of the light control sheet 10 is facilitated, compared to when the adhesive layer 43 is exposed.

Also, with the inside of the groove 32 filled with the adhesive portion 47, the groove 32 is suppressed from being conspicuous, i.e., the boundary region 23 is suppressed from being conspicuous, when seen from a position facing the first surface 11F of the light control sheet 10. Furthermore, when the opening 33 of the groove 32 is covered by the adhesive layer 43 and the protective layer 44, the groove 32 is further suppressed from being conspicuous.

To more suitably suppress the groove 32 from being conspicuous, it is preferable that the refractive indexes of the first transparent electrode layer 41A, the first transparent support layer 42A, the adhesive layer 43 and the adhesive portion 47, and the protective layer 44 are close to one another. As the difference between these refractive indexes is smaller, the reflection and refraction of light near the groove 32 are more suppressed, and thus the groove 32 is less likely to be visually recognized.

For example, indium tin oxide widely used as the material of the first transparent electrode layer 41A has a refractive index of about 2.1 to 2.2, and polyethylene terephthalate and acrylic resin widely used as the material of the first transparent support layer 42A have a refractive index of about 1.4 to 1.5. Therefore, the refractive index of the adhesive constituting the adhesive layer 43 and the adhesive portion 47 is preferably 1.4 or more and 1.5 or less, and the refractive index of the protective layer 44 is preferably 1.4 or more and 1.6 or less.

Figure 4:
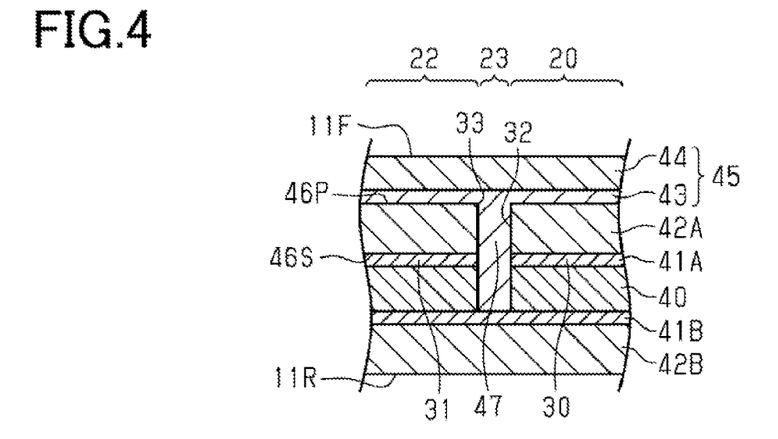
FIG. 4 is a diagram illustrating another example of a cross-sectional structure taken along line III-III in FIG. 1.
Figure 5:
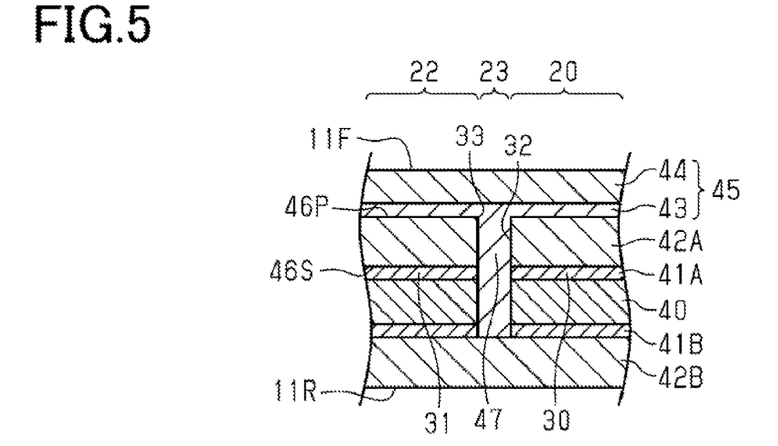
FIG. 5 is a diagram illustrating another example of a cross-sectional structure taken along line III-III in FIG. 1.

It is noted that the groove 32 may extend to the inside of the light control layer 40 in the depth direction. For example, as illustrated in FIG. 4, the groove 32 may penetrate the light control layer 40, or the bottom of the groove 32 may be positioned inside the light control layer 40. Alternatively, for example, as illustrated in FIG. 5, the groove 32 may penetrate the light control layer 40 and the second transparent electrode layer 41B. It is noted that the groove 32 does not penetrate the second transparent support layer 42B, and the second transparent support layer 42B is continuous in a portion positioned beneath the groove 32 in the depth direction.

When the groove 32 extends to the inside of the light control layer 40, the insulation reliability between the drive electrode element 30 and the floating electrode element 31 can be enhanced.

Also, when the groove 32 penetrates the second transparent electrode layer 41B, a portion of the second transparent electrode layer 41B positioned in the floating region 22 is insulated from the surroundings, and a voltage signal is not applied to this portion. Therefore, occurrence of a potential difference between the first transparent electrode layer 41A and the second transparent electrode layer 41B is suppressed in the floating region 22, regardless of the potential of the second transparent electrode layer 41B in the drive region 20. In other words, regardless of the amplitude and fluctuation of a voltage signal applied to the second transparent electrode layer 41B of the drive region 20, the orientation state of the liquid crystal molecules of the light control layer 40 in the floating region 22 does not change. This enhances the degree of flexibility in controlling the potential of the second transparent electrode layer 41B in the drive region 20.

The width of the groove 32 may or may not be constant in the depth direction. For example, the width of the groove 32 may decrease toward the bottom of the groove. In other words, the groove 32 may have a V shape in cross section. When the groove 32 has a V shape in cross section, an adhesive can easily flow into the groove 32 to fill the groove 32.

In order to suppress the groove 32 from being conspicuous when seen from a position facing the first surface 11F of the light control sheet 10, the width of the groove 32 on the opening 33 is preferably 1 mm or less and more preferably 0.5 mm or less.

Method of Producing Light Control Sheet

With reference to FIGS. 6 to 9, the method of producing the light control sheet 10 will be described.

Figure 6:
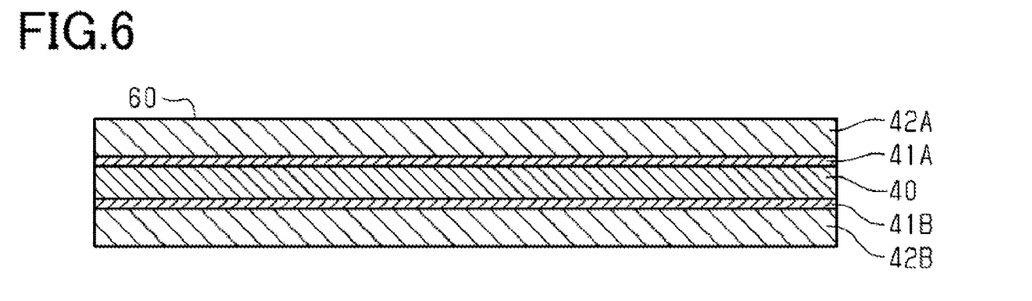
FIG. 6 is a schematic diagram for describing a method of producing a light control sheet according to an embodiment of the present invention.

As illustrated in FIG. 6, a laminate 60 including the light control layer 40, the transparent electrode layers 41A and 41B, and the transparent support layers 42A and 42B is formed by firstly forming the light control layer 40 between the first transparent electrode layer 41A supported by the first transparent support layer 42A and the second transparent electrode layer 41B supported by the second transparent support layer 42B. At this point, the first transparent electrode layer 41A is a uniform layer which is not divided into the drive electrode element 30 and the floating electrode element 31.

Figure 7:
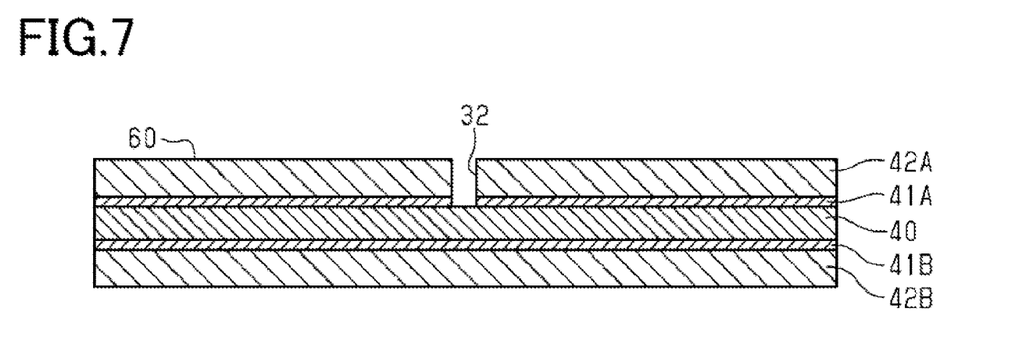
FIG. 7 is a schematic diagram for describing a method of producing a light control sheet according to an embodiment of the present invention.

Subsequently, as illustrated in FIG. 7, the groove 32 is formed in the laminate 60 from the outer side of the laminate 60. Specifically, the groove 32 is formed by making a cut in the laminate 60 from a side where the first transparent support layer 42A is positioned relative to the light control layer 40. The groove 32 is formed using a cutting device such as a cutting plotter or a laser cutter.

Figure 8:
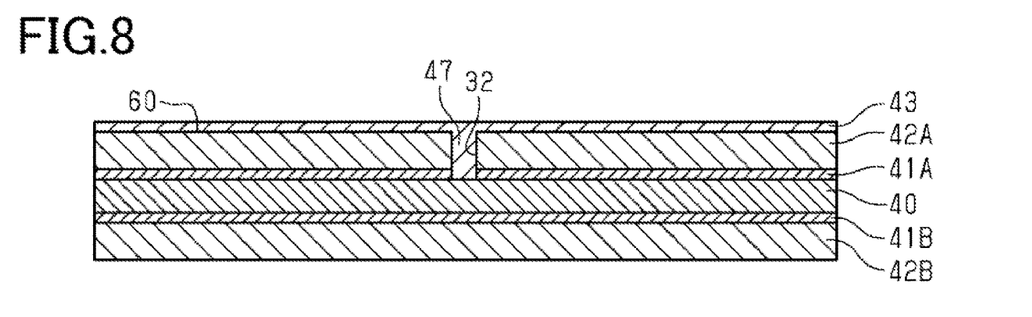
FIG. 8 is a schematic diagram for describing a method of producing a light control sheet according to an embodiment of the present invention.
Figure 9:
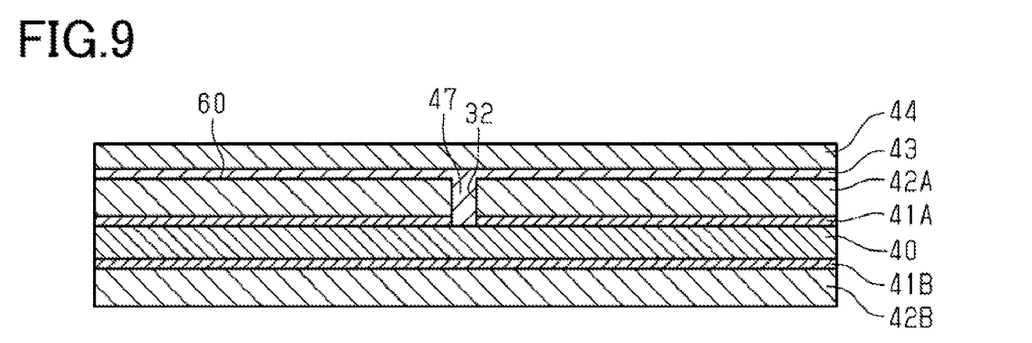
FIG. 9 is a schematic diagram for describing a method of producing a light control sheet according to an embodiment of the present invention.

Subsequently, as illustrated in FIG. 8, an adhesive is applied to the first transparent support layer 42A in the laminate 60 to form the adhesive layer 43 and the adhesive portion 47. The groove 32 is filled by the formation of the adhesive portion 47. Then, as illustrated in FIG. 9, the protective layer 44 is bonded to the adhesive layer 43.

The adhesive layer 43 and the adhesive portion 47 may be formed by bonding a film-like adhesive such as an OCA film to the laminate 60 or by coating the laminate 60 with an adhesive having fluidity. Even with a film-like adhesive, filling of the groove 32 with an adhesive is possible because a film made of this adhesive has flexibility. Also, heating and pressure application may be performed in forming the adhesive layer 43 and the adhesive portion 47 and in laminating the protective layer 44.

Alternatively, in place of applying an adhesive to the laminate 60, an adhesive may be applied to the surface of the protective layer 44 to form the adhesive layer 43, and the protective layer 44 and the adhesive layer 43 may be bonded to the laminate 60.

The connection region 24 is formed by cutting out a portion of the constituent layers of the laminate 60. The connection region 24 may be formed in the same process as the formation of the groove 32 or may be formed after the adhesive layer 43 and the protective layer 44 have been laminated on the laminate 60. When the connection region 24 is formed in the same process as the formation of the groove 32, the number of processes and time required for the production of the light control sheet 10 can be reduced.

It is noted that since the first transparent electrode layer 41A is very much thinner than the light control layer 40, the burden in controlling the depth of the groove 32 is smaller when the groove 32 is formed such that the bottom of the groove 32 is positioned in the light control layer 40, compared to when the groove 32 is formed such that the groove 32 penetrates the first transparent electrode layer 41A and does not intrude into the light control layer 40. Therefore, in the form in which the bottom of the groove 32 is positioned in the light control layer 40, insulation reliability between the drive electrode element 30 and the floating electrode element 31 can be enhanced while suppressing an increase in the manufacturing effort.

As described above, in the present embodiment, the groove 32 for insulation between the drive electrode element 30 and the floating electrode element 31 is formed by laminating the transparent electrode layers 41A and 41B, transparent support layers 42A and 42B, and light control layer 40, and thereafter making a cut in the laminate 60 including these layers from the outer side. Therefore, the number of processes and time required for separation into the drive electrode element 30 and the floating electrode element 31 can be reduced, and devices therefor can be simplified, compared to when an electrode element is divided by etching or the like before the formation of the laminate 60. Also, the degree of flexibility in shape of the drive electrode element 30 and the floating electrode element 31 increases. Furthermore, design changes in shape of the drive electrode element 30 and the floating electrode element 31 can be easily handled.

Operation

Figure 10:
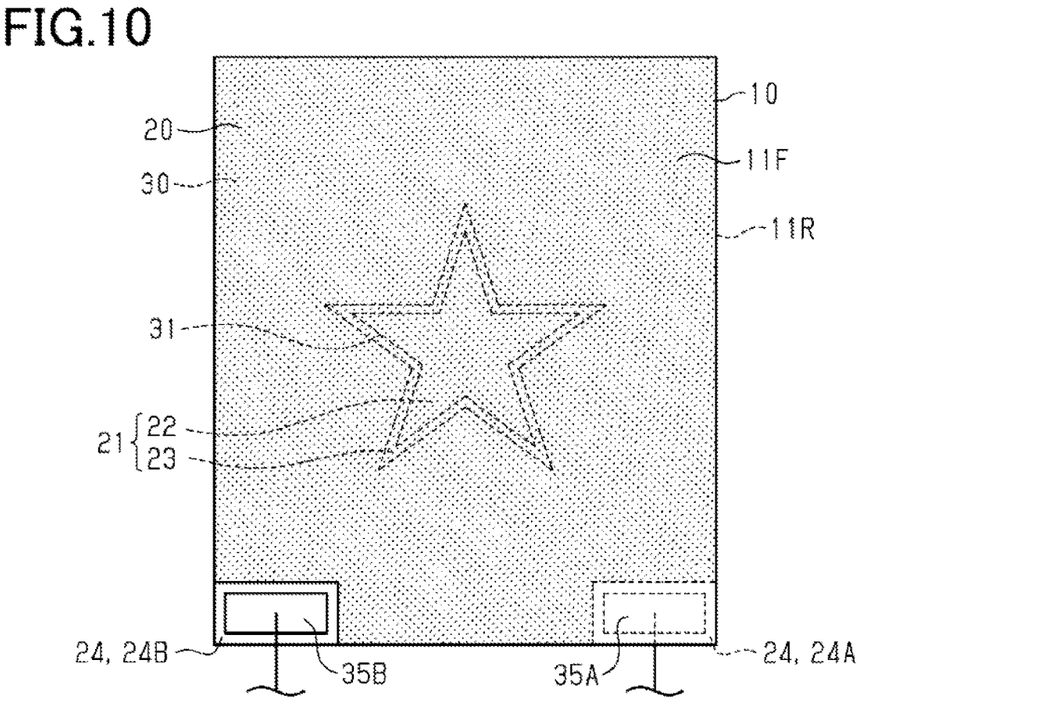
FIG. 10 is a diagram illustrating a planar structure of a light control sheet in an undriven state according to an embodiment of the present invention.

FIG. 10 is a diagram schematically illustrating the transparency level of the light control sheet 10 when the light control sheet 10 is not driven, i.e., when a voltage signal is not applied to the transparent electrode layers 41A and 41B.

As illustrated in FIG. 10, when the light control sheet 10 is not driven, the drive region 20 and the floating region 22 are both opaque. Accordingly, the entire surface of the light control sheet 10 appears, for example, whitish and turbid, and an image such as a letter or a picture constituted by the floating region 22 is not visually recognized.

In contrast to this, when the light control sheet 10 is driven, i.e., when a voltage signal is applied to the transparent electrode layers 41A and 41B, the drive region 20 is transparent, while the floating region 22 is opaque. Accordingly, as illustrated in FIG. 1, only the floating region 22 appears, for example, whitish and turbid, and an image such as a letter or a picture constituted by the floating region 22 can be visually recognized.

In this manner, according to the light control sheet 10 of the present embodiment, regions having different light transmittances are formed in the plane of the light control sheet 10, and a difference in light transmittance between these regions occurs only when the light control sheet 10 is driven. Therefore, when the light control sheet 10 is driven, an image such as a letter or a picture constituted by the floating region 22 is visually recognized, and thus decoration is possible for a space where the light control sheet 10 is installed. Furthermore, the state of an image can be switched between visible and not visible by switching the light control sheet 10 between being driven and being not driven. Thus, the decoration state of a space can be dynamically changed. This can improve the designability of the light control sheet 10.

It is noted that when the light control layer 40 is present in the boundary region 23, the boundary region 23 is always opaque. Therefore, the drive region 20 and the non-driven region 21 both appear opaque when the light control sheet 10 is not driven, and the entire non-driven region 21 appears opaque when the light control sheet 10 is driven. On the other hand, when the groove 32 for separating between the drive electrode element 30 and the floating electrode element 31 penetrates the light control layer 40 so that the light control layer 40 is not present in the boundary region 23, the boundary region 23 is always transparent. Therefore, when the light control sheet is not driven, the drive region 20 and the floating region 22 are opaque, while the boundary region 23 is transparent; however, the boundary region 23, which is in the shape of a thin line, is unlikely to be conspicuous, and thus an image such as a letter or a picture constituted by the floating region 22 is unlikely to be visually recognized. When the light control sheet 10 is driven, the boundary region 23 appears transparent and integral with the drive region 20.

In order to suppress the boundary region 23 from being conspicuous when the light control sheet 10 is not driven, it is preferable that the groove 32 does not penetrate the light control layer 40, and at least part of the light control layer 40 is present in the thickness direction in the boundary region 23. Alternatively, the boundary region 23 may be conspicuous when the light control sheet 10 is not driven such that the boundary region 23 having a frame shape is visually recognized as part of the design of the light control sheet 10. In this case, the light control layer 40 may not be present in the boundary region 23, and the width of the boundary region 23 may be increased.

As described above, advantages enumerated below can be obtained according to the present embodiment.

(1) The presence and absence of a difference in light transmittance between the drive region 20 and the floating region 22 can be switched by controlling the application of a voltage signal to the drive electrode element 30 and the floating electrode element 31, which can change the visibility of an image constituted by the floating region 22. This allows for dynamic changes in the decoration state of a space due to the light control sheet 10 and for improvement in designability of the light control sheet 10.

(2) The groove 32 for insulation between the drive electrode element 30 and the floating electrode element 31 penetrates the first transparent support layer 42A and the first transparent electrode layer 41A. Such a structure can be formed by laminating the transparent electrode layers 41A and 41B, transparent support layers 42A and 42B, and light control layer 40, and thereafter making a cut in the first transparent support layer 42A and the first transparent electrode layer 41A from the surface of the first transparent support layer 42A.

Therefore, the drive electrode element 30 and the floating electrode element 31 can be easily separated. Also, the degree of flexibility in shape of the drive electrode element 30 and the floating electrode element 31 increases. Furthermore, design changes in shape of the drive electrode element 30 and the floating electrode element 31 can be easily handled.

(3) Since the opening 33 of the groove 32 is covered by the covering layer 45, it is possible to suppress conductive material from entering the groove 32 and the drive electrode element 30 and the floating electrode element 31 from being electrically connected to each other. Also, the groove 32 is suppressed from being conspicuous when seen from the first surface 11F of the light control sheet 10.

(4) Since the inside of the groove 32 is filled with the filling portion extending from the covering layer 45, insulation reliability between the drive electrode element 30 and the floating electrode element 31 is enhanced. Moreover, the covering layer 45 contains the adhesive layer 43 and the protective layer 44, and the filling portion is the adhesive portion 47 extending from the adhesive layer 43. That is, since the inside of the groove 32 is filled with an adhesive having flexibility and fluidity, the groove 32 can be easily filled. In addition, since the protective layer 44 is laminated on the adhesive layer 43, adhesion of dirt to the adhesive layer 43 is suppressed, and handling of the light control sheet 10 is facilitated.

(5) When the layers contained in the covering layer 45 have a refractive index of 1.4 or more and 1.6 or less, the refractive index of the covering layer 45 is larger than that of air. Accordingly, a difference in refractive index between the first transparent support layer 42A and the covering layer 45 is likely to be small. Since this reduces a difference in refractive index at an interface around the groove 32 and suppresses reflection and refraction of light, compared to when the groove 32 is exposed to air, the groove 32 is unlikely to be conspicuous.

(6) When the groove 32 extends to the inside of the light control layer 40 in the depth direction, insulation reliability between the drive electrode element 30 and the floating electrode element 31 is enhanced.

(7) When the groove 32 penetrates the light control layer 40 and the second transparent electrode layer 41B in the depth direction of the groove 32, the second transparent electrode layer 41B is also divided into mutually insulated portions corresponding to the drive electrode element 30 and the floating electrode element 31. Therefore, a potential difference between the first transparent electrode layer 41A and the second transparent electrode layer 41B can be appropriately controlled for each of the divided regions. This allows for appropriate control of the light transmittance of the regions where the electrode elements 30 and 31 are positioned.

(8) When seen from a position facing the first surface 11F, the groove 32 has a closed frame shape that surrounds the floating electrode element 31. Accordingly, the drive electrode element 30 and the floating electrode element 31 can be easily insulated such that the floating region 22 constitutes a letter, number, symbol, figure, picture, and others, and the degree of flexibility in arrangement and shape of the floating electrode element 31 can also be increased. This enhances the degree of flexibility in configuration of an image to appear on the light control sheet 10.

(9) Of the drive electrode element 30 and the floating electrode element 31, only the drive electrode element 30 is connected to the terminal units 35A and 35B. This allows for switching between a state in which there is no difference in light transmittance between the drive region 20 and the floating region 22 and a state in which there is a difference in light transmittance between the drive region 20 and the floating region 22, depending on the presence or absence of the application of a voltage signal to the drive electrode element 30. Therefore, the designability of the light control sheet can be improved with a simple configuration.

Modification

The above-described embodiment may be implemented with the modifications described below. The following modifications may also be implemented in combination.

Figure 11:
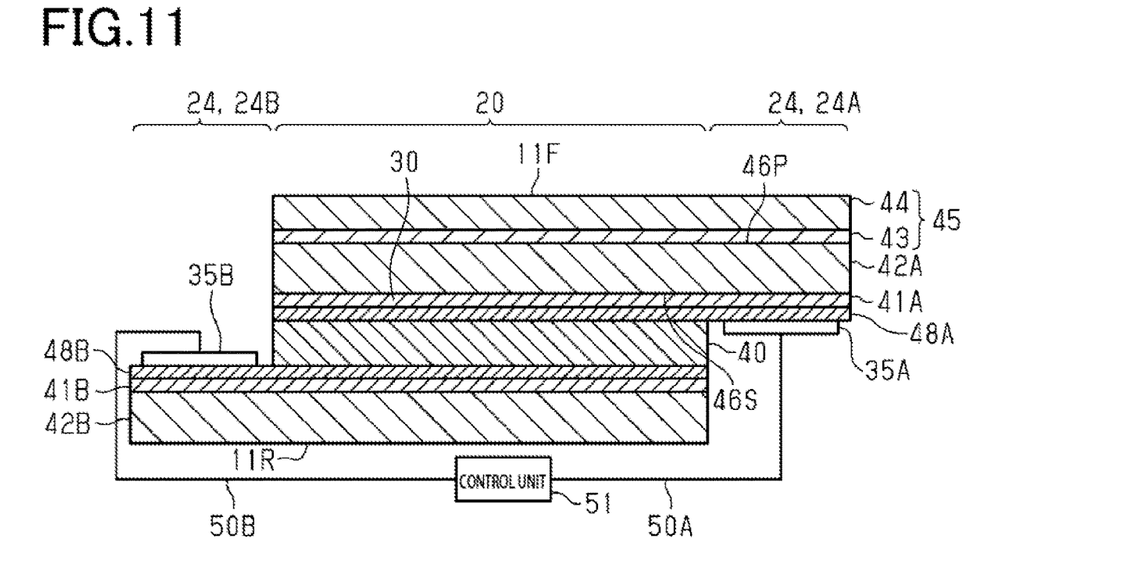
FIG. 11 is a diagram illustrating a cross-sectional structure of a light control sheet according to a modification of an embodiment of the present invention.

As illustrated in FIG. 11, the light control sheet 10 includes a first orientation layer 48A and a second orientation layer 48B. The first orientation layer 48A is positioned between and in contact with the light control layer 40 and the first transparent electrode layer 41A. The second orientation layer 48B is positioned between and in contact with the light control layer 40 and the second transparent electrode layer 41B.

Each of the first orientation layer 48A and the second orientation layer 48B may be, for example, a perpendicular orientation film. The perpendicular orientation film orients the major axis direction of the liquid crystal molecules along the thickness direction of the light control layer 40. The material of each of the first orientation layer 48A and the second orientation layer 48B is an organic compound, an inorganic compound, or a mixture thereof. Examples of the organic compound include polyimide, polyamide, polyvinyl alcohol, and cyanide compounds. Examples of the inorganic compound include silicon oxide and zirconium oxide. The material of the orientation layers 48A and 48B may be silicone. Silicone is a compound that contains an inorganic moiety and an organic moiety.

In the light control sheet 10 including the orientation layers 48A and 48B, when a voltage signal is not applied to the transparent electrode layers 41A and 41B, the major axis direction of the liquid crystal molecules is a direction along the thickness direction of the light control layer 40 in the drive region 20; thus, the drive region 20 is transparent. On the other hand, when a voltage signal is applied to the transparent electrode layers 41A and 41B, the major axis direction of the liquid crystal molecules is a direction crossing the thickness direction of the light control layer 40 in the drive region 20; thus, the drive region 20 appears turbid and is opaque.

In the light control sheet 10 including the orientation layers 48A and 48B, the major axis direction of the liquid crystal molecules is always a direction along the thickness direction of the light control layer 40 in the floating region 22; thus, the floating region 22 is always transparent.

Therefore, when the light control sheet 10 is not driven, the drive region 20 and the floating region 22 are both transparent, and an image such as a letter or a picture constituted by the floating region 22 is not visually recognized. On the other hand, when the light control sheet is driven, the drive region 20 becomes opaque, while the floating region 22 is transparent; thus, an image such as a letter or a picture constituted by the floating region 22 can be visually recognized.

The groove 32 for separating between the drive electrode element 30 and the floating electrode element 31 penetrates at least the first transparent support layer 42A and the first transparent electrode layer 41A, in the same manner as the above-described embodiment. The groove 32 may further extend partially or entirely into the first orientation layer 48A, light control layer 40, second orientation layer 48B, and second transparent electrode layer 41B.

When the groove 32 does not penetrate the first orientation layer 48A, or when the groove 32 penetrates the light control layer 40, the boundary region 23 is always transparent and appears integral with the floating region 22. Therefore, it is preferable that the groove 32 does not penetrate the first orientation layer 48A or extends to a position where it penetrates the light control layer 40, in order to suppress the boundary region 23 from being conspicuous when the light control sheet 10 is not driven.

As described above, even when the light control sheet 10 includes the orientation layers 48A and 48B, the drive region 20 and the floating region 22, which are regions where a difference in light transmittance occurs only when the light control sheet 10 is driven, are present in the plane of the light control sheet 10. Therefore, the designability of the light control sheet 10 can be improved.

The protective layer 44 may be a layer whose light transmittance is lower than that of the first transparent support layer 42A. For example, the protective layer 44 may be a colored film such as a half mirror film or a smoky film. When the light transmittance of the protective layer 44 is lower than that of the first transparent support layer 42A, the appearance of the light control sheet 10 varies depending on the intensity of a light source behind the light control sheet 10. For example, when the protective layer 44 is a half mirror film, the first surface 11F of the light control sheet 10 appears to be a mirror surface when a light source behind the light control sheet 10 is weak. When the protective layer 44 is a smoky film, the light control sheet 10 appears dark-colored such as black when a light source behind the light control sheet 10 is weak. Accordingly, the decoration state of a space due to the light control sheet 10 can be changed more variously, and thus the designability of the light control sheet 10 can be further improved.

The number and material of layers contained in the covering layer 45 are not particularly limited. The covering layer 45 may contain only one of the adhesive layer 43 and the protective layer 44 or may contain a layer that is different from the adhesive layer 43 and the protective layer 44. As long as the covering layer 45 covers the opening 33 of the groove 32, the effect of suppressing conductive material from entering the groove 32 can be obtained.

The filling portion to fill the groove 32 may be constituted by a material that is different from an adhesive. For example, a thermosetting resin or a photosetting resin used as a hard coat material may be applied to the first transparent support layer 42A having the groove 32 and be cured by heat or light to form the filling portion and the covering layer 45. In this case, the filling portion and the covering layer 45 are constituted by a curable resin, and the filling portion extends to the inside of the groove 32 from the covering layer 45.

Even when the material of the filling portion and the covering layer 45 is different from that in the above-described embodiment, the refractive index of the filling portion and the one or more layers contained in the covering layer 45 is preferably 1.4 or more and 1.6 or less, in order to suppress the groove 32 from being conspicuous.

It is noted that the inside of the groove 32 may be partially or entirely filled with the filling portion, as long as the opening 33 of the groove 32 is covered by the covering layer 45.

The covering layer 45 may contain a layer having ultraviolet-absorbing properties. For example, at least one of the adhesive layer 43 and the protective layer 44 may have ultraviolet-absorbing properties. According to such a configuration, ultraviolet light contained in sunlight or the like falling on the light control sheet 10 is absorbed by the covering layer 45 and unlikely to reach the light control layer 40. Therefore, deterioration in function of the liquid crystal composition is suppressed.

Figure 12:
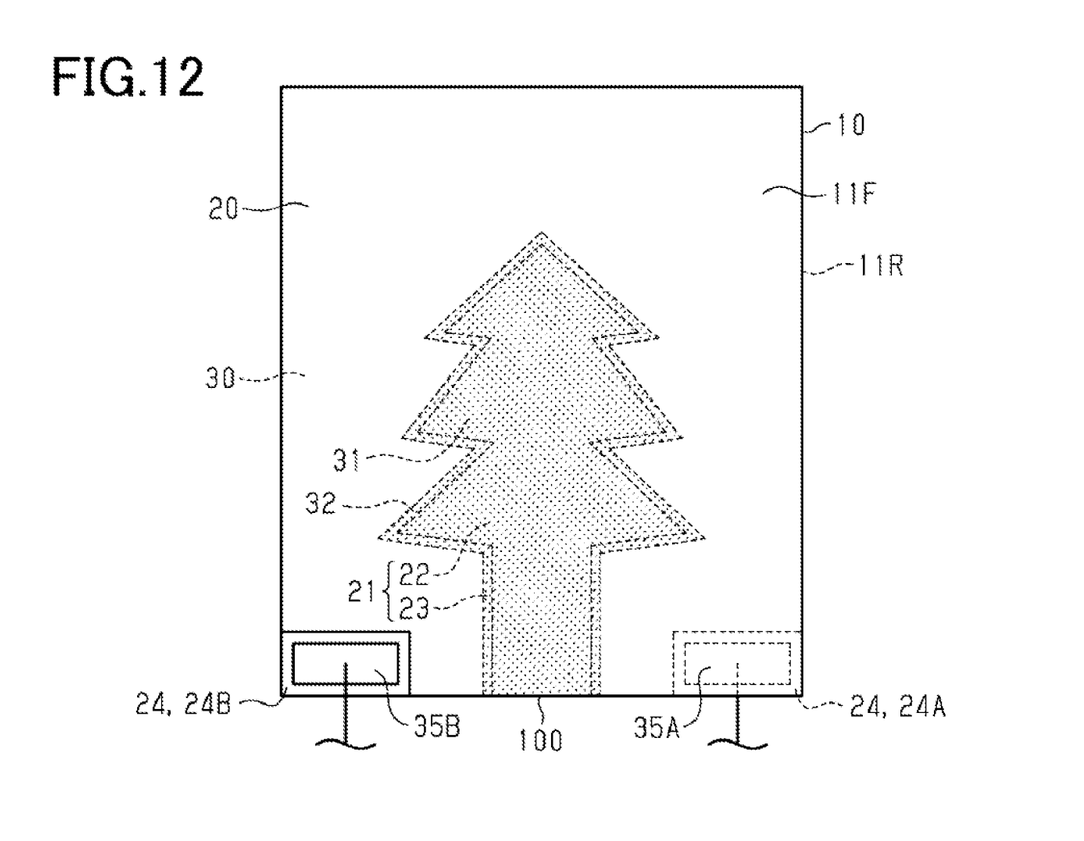
FIG. 12 is a diagram illustrating a planar structure of a light control sheet according to a modification of an embodiment of the present invention.

The groove 32 positioned in the boundary region 23 may not have a closed frame shape that surrounds the floating electrode element 31, as long as it extends in a direction along the support surface 46S of the first transparent support layer 42A. For example, as illustrated in FIG. 12, when seen from a position facing the first surface 11F, the boundary region 23 and the groove 32 may extend from a start point positioned at an edge 100 of the light control sheet 10 to an end point positioned at the edge 100 of the light control sheet 10 through the outer periphery of the floating region 22 and the floating electrode element 31. In this case, the ends of the floating region 22 and the floating electrode element 31 are positioned at the edge 100 of the light control sheet 10. Although the lower edge, in FIG. 12, of the rectangular light control sheet 10 is at the edge 100 in FIG. 12, the edge 100 at which the start point and end point of the boundary region 23 and the groove 32 are positioned may be any one or combinations of the upper edge, left edge, and right edge.

In the above-described embodiment, a voltage signal is applied to the drive electrode element 30 as a first electrode element and not applied to the floating electrode element 31 as a second electrode element. Instead of this, a voltage signal may be separately applied to the first electrode element and the second electrode element. The wiring for applying a voltage signal to the second electrode element is connected to the end of the second electrode element via a terminal unit. A terminal unit connected to the first electrode element and a terminal unit connected to the second electrode element are separate terminal units for respective voltage signals. When the second electrode element is positioned at the edge of the light control sheet 10 as described above, a wiring is easily connected to the second electrode element.

For example, a first region where the first electrode element is positioned is switched between transparent and opaque, in response to switching of the application state of a voltage signal to the first electrode element. A second region where the second electrode element is positioned is switched between transparent and opaque independently from the first region, in response to switching of the application state of a voltage signal to the second electrode element. According to such a configuration, switching can be performed between the following four states: a state in which the first and second regions are both transparent, a state in which the first region is opaque while the second region is transparent, a state in which the first region is transparent while the second region is opaque, and a state in which the first and second regions are both opaque. Accordingly, the decoration state of a space due to the light control sheet 10 can be changed more variously, and thus the designability of the light control sheet 10 can be further improved.

Also, for example, the light transmittance of at least one of the first region and the second region may be controlled to a value corresponding to a light transmittance between transparent and opaque. In the light control sheet 10 including the light control layer 40 containing a liquid crystal composition, the light transmittance of the light control sheet 10 gradually changes with a change in potential difference between the transparent electrode layers 41A and 41B, when the potential difference is within a predetermined range. Therefore, the first region or the second region can be controlled to a translucency having a light transmittance between transparent and opaque, by controlling the potential difference between the transparent electrode layers 41A and 41B to a value between a potential difference that allows the region to become transparent and a potential difference that allows the region to become opaque.

Specifically, for example, the first region is switched between transparent and opaque in response to switching of the application state of a voltage signal to the first electrode element, and the second region is switched between translucent and opaque in response to switching of the application state of a voltage signal to the second electrode element. When the first region is transparent, the second region is controlled to be translucent. According to such a configuration, switching can be performed between a state in which the first region and the second region are both opaque and a state in which the first region is opaque while the second region is translucent. This can also improve the designability of the light control sheet 10.

In the present embodiment, the drive region 20 is the first region, and the floating region 22 is the second region.

A light control sheet includes a light control layer that contains a liquid crystal composition, and a pair of transparent electrode layers that sandwich the light control layer. A drive voltage is applied between the pair of transparent electrode layers. Depending on a potential difference between the pair of transparent electrode layers, the orientation state of liquid crystal molecules varies, and thus the light transmittance of the light control sheet varies. For example, when the major axis direction of liquid crystal molecules is along the thickness direction of the light control layer, the light control sheet is colorless and transparent as well as high in light transmittance. When the major axis direction of liquid crystal molecules is orthogonal to the thickness direction of the light control layer, light is scattered in the light control layer, and the light transmittance of the light control sheet is low (see, for example, JP 2018-45135 A).

The light control sheet may be bonded to members for partitioning a space, for example, a building material such as a window glass or partition of a building, or a window glass of a vehicle, so as to be used as a part of such members. In recent years, attention has been paid to the designability of the light control sheet, for enhancing the added value of the light control sheet. The improvement in designability of the light control sheet can significantly expand the application range of the light control sheet and create new demand for spaces in which light is controlled. Therefore, a control sheet having enhanced designability is desired to be developed.

In an aspect, a light control sheet is provided. The light control sheet includes: a first transparent electrode layer; a second transparent electrode layer; a light control layer positioned between the first transparent electrode layer and the second transparent electrode layer; a first transparent support layer positioned on the opposite side of the first transparent electrode layer to that facing the light control layer, the first transparent support layer having a support surface supporting the first transparent electrode layer and a protected surface opposite the support surface; and a covering layer positioned on the opposite side of the first transparent support layer to that facing the first transparent electrode layer, the covering layer being constituted by at least one layer. The first transparent electrode layer includes a first electrode element and a second electrode element; the first electrode element and the second electrode element are separate layer members aligned along the support surface and are electrically insulated from each other by a groove extending in a direction along the support surface; the groove penetrates the first transparent support layer and the first transparent electrode layer in a depth direction of the groove and has an opening on the protected surface, the depth direction being defined as a thickness direction of the first transparent electrode layer; and the opening is covered by the covering layer.

In another aspect, a method of producing a light control sheet is provided. The method of producing a light control sheet includes: forming a laminate that includes a first transparent electrode layer, a second transparent electrode layer, a light control layer positioned between the first transparent electrode layer and the second transparent electrode layer, and a first transparent support layer that is positioned on the opposite side of the first transparent electrode layer to that facing the light control layer and that has a support surface supporting the first transparent electrode layer; making a cut in the laminate from a side where the first transparent support layer is positioned relative to the light control layer, to form a groove that extends in a direction along the support surface and penetrates the first transparent support layer and the first transparent electrode layer, thereby forming, in the first transparent electrode layer, a first electrode element and a second electrode element separated by the groove; and laminating, on the laminate, a covering layer that covers an opening of the groove.

Obviously, numerous modifications and variations of the present invention are possible in light of the above teachings. It is therefore to be understood that within the scope of the appended claims, the invention may be practiced otherwise than as specifically described herein.

What is claimed is:

1. A light control sheet, comprising:
a plurality of transparent electrodes comprising a first transparent electrode layer and a second transparent electrode layer;
a light control layer formed between the first transparent electrode layer and the second transparent electrode layer;
a transparent support layer formed on the first transparent electrode layer on an opposite side with respect to the light control layer; and
a covering layer formed on the transparent support layer on an opposite side with respect to the first transparent electrode layer,
wherein the transparent support layer has a support surface supporting the first transparent electrode layer and a protected surface on an opposite side with respect to the support surface, the first transparent electrode layer includes a first electrode element and a second electrode element such that the first electrode element and the second electrode element are aligned along the support surface of the transparent support layer and electrically insulated from each other by a groove extending in a direction along the support surface of the transparent support layer and that the groove is penetrating through the transparent support layer and the first transparent electrode layer in a depth direction of the groove and has an opening on the protected surface of the transparent support layer, and the covering layer is formed such that the covering layer is covering the opening of the groove formed in the transparent support layer and the first transparent electrode layer, the groove being between the covering layer and at least a surface of the second transparent electrode layer.

2. The light control sheet according to claim 1, further comprising:

a filling portion extending from the covering layer to an inside of the groove formed in the transparent support layer and the first transparent electrode layer such that the filling portion is filling an inside of the groove.

3. The light control sheet according to claim 2, wherein the covering layer includes at least one layer having a refractive index in a range of 1.4 to 1.6.

4. The light control sheet according to claim 2, wherein the covering layer includes a layer having ultraviolet-absorbing property.

5. The light control sheet according to claim 2, wherein the covering layer includes a layer having a lower light transmittance than the transparent support layer.

6. The light control sheet according to claim 2, wherein the groove extends to an inside of the light control layer in the depth direction.

7. The light control sheet according to claim 2, wherein the groove is penetrating through the light control layer and the second transparent electrode layer in the depth direction.

8. The light control sheet according to claim 2, wherein the groove has a closed frame shape surrounding the second electrode element.

9. The light control sheet according to claim 2, further comprising:

a terminal unit connected to only the first electrode element such that the terminal unit is configured to be applied with a voltage signal for driving the light control sheet.

10. The light control sheet according to claim 2, further comprising:

a plurality of terminal units connected to the first electrode element and the second electrode element respectively such that the plurality of terminal units is configured to be applied with voltage signals for driving the light control sheet, respectively.

11. The light control sheet according to claim 1, wherein the covering layer includes an adhesive layer having insulation property and formed in contact with the protected surface of the transparent support layer, and a protective layer formed in contact with the adhesive layer on an opposite side with respect to the transparent support layer, and the light control sheet includes an adhesive portion extending from the adhesive layer to an inside of the groove formed in the transparent support layer and the first transparent electrode layer such that the adhesive portion is filling an inside of the groove.

12. The light control sheet according to claim 1, wherein the covering layer includes at least one layer having a refractive index in a range of 1.4 to 1.6.

13. The light control sheet according to claim 1, wherein the covering layer includes a layer having ultraviolet-absorbing property.

14. The light control sheet according to claim 1, wherein the covering layer includes a layer having a lower light transmittance than the transparent support layer.

15. The light control sheet according to claim 1, wherein the groove extends to an inside of the light control layer in the depth direction.

16. The light control sheet according to claim 1, wherein the groove is penetrating through the light control layer and the second transparent electrode layer in the depth direction.

17. The light control sheet according to claim 1, wherein the groove has a closed frame shape surrounding the second electrode element.

18. The light control sheet according to claim 1, further comprising:

a terminal unit connected to only the first electrode element such that the terminal unit is configured to be applied with a voltage signal for driving the light control sheet.

19. The light control sheet according to claim 1, further comprising:

a plurality of terminal units connected to the first electrode element and the second electrode element respectively such that the plurality of terminal units is configured to be applied with voltage signals for driving the light control sheet, respectively.

20. A method of producing a light control sheet, comprising:

forming a laminate comprising a first transparent electrode layer, a second transparent electrode layer, a light control layer, and a transparent support layer;

making a cut in the laminate such that a groove is formed to penetrate through the transparent support layer and the first transparent electrode layer and that a first electrode element and a second electrode element separated by the groove are formed in the first transparent electrode layer; and laminating a covering layer on the laminate such that the covering layer covers an opening of the groove formed in the transparent support layer and the first transparent electrode layer, wherein the light control layer is formed between the first transparent electrode layer and the second transparent electrode layer, the transparent support layer is formed on the first transparent electrode layer on an opposite side with respect to the light control layer and has a support surface supporting the first transparent electrode layer, and the cut is made in the laminate from a side where the transparent support layer is formed relative to the light control layer such that the groove extends in a direction along the support surface, the groove being between the covering layer and at least a surface of the second transparent electrode layer.

* * * * *